(12) United States Patent
Song et al.

(10) Patent No.: US 12,346,525 B2
(45) Date of Patent: Jul. 1, 2025

(54) DISPLAY MODULE AND DEVICE WITH TOUCH MODE AND ULTRASONIC MODE

(71) Applicant: VIVO MOBILE COMMUNICATION CO., LTD., Dongguan (CN)

(72) Inventors: Yalei Song, Dongguan (CN); Rongyan Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/403,710

(22) Filed: Jan. 3, 2024

(65) Prior Publication Data

US 2024/0134484 A1 Apr. 25, 2024
US 2024/0231544 A9 Jul. 11, 2024

Related U.S. Application Data

(63) Continuation of application No. PCT/CN2022/105208, filed on Jul. 12, 2022.

(30) Foreign Application Priority Data

Jul. 15, 2021 (CN) .......................... 202110799651.1

(51) Int. Cl.
*G06F 3/01* (2006.01)
*G06F 3/041* (2006.01)
(Continued)

(52) U.S. Cl.
CPC ............ *G06F 3/043* (2013.01); *G06F 3/0412* (2013.01); *G06F 3/0445* (2019.05); *G06F 3/0446* (2019.05); *G06F 2203/04106* (2013.01)

(58) Field of Classification Search
CPC ...... G06F 3/0412; G06F 3/043; G06F 3/0445; G06F 3/0446; G06F 2203/04106
See application file for complete search history.

(56) References Cited

U.S. PATENT DOCUMENTS 9,984,271 B1 5/2018 King et al.
11,669,199 B2 * 6/2023 Yousefpor ............. G06F 3/0436
345/177
(Continued)

FOREIGN PATENT DOCUMENTS

CN 109948496 A 6/2019
CN 111868735 A 10/2020
(Continued)

OTHER PUBLICATIONS

International Search Report issued in corresponding International Application No. PCT/CN2022/105208, mailed Oct. 10, 2022, 4 pages.

*Primary Examiner* — Liliana Cerullo
(74) *Attorney, Agent, or Firm* — IPX PLLC (57) ABSTRACT

A display module and an electronic device are provided. The display module includes an acoustic-electrical conversion layer, first electrodes, second electrodes, and third electrodes. The first electrodes and the third electrodes are provided on two opposite sides of the acoustic-electrical conversion layer, and second electrodes are provided at intervals on the two opposite sides of the acoustic-electrical conversion layer. In a thickness direction of the acoustic-electrical conversion layer, projections of the first electrodes and projections of the third electrodes are arranged at intervals, and one of the first electrodes or one of the third electrodes is disposed corresponding to at least two of the second electrodes.

18 Claims, 5 Drawing Sheets

(51) Int. Cl.
    *G06F 3/043*    (2006.01)
    *G06F 3/044*    (2006.01)

(56) References Cited

U.S. PATENT DOCUMENTS

| | | | |
|---|---|---|---|
| 2019/0122018 A1* | 4/2019 | Kho | G06V 40/1306 |
| 2021/0019018 A1 | 1/2021 | Guo et al. | |
| 2021/0120324 A1* | 4/2021 | Seo | H04R 3/00 |
| 2021/0223882 A1* | 7/2021 | Ding | G06F 3/043 |
| 2022/0230009 A1* | 7/2022 | Yao | G06V 40/1306 |

FOREIGN PATENT DOCUMENTS

| | | |
|---|---|---|
| CN | 112130688 A | 12/2020 |
| CN | 113486832 A | 10/2021 |

* cited by examiner

DISPLAY MODULE AND DEVICE WITH TOUCH MODE AND ULTRASONIC MODE

CROSS-REFERENCE TO RELATED APPLICATIONS

The present disclosure is a continuation of International Application No. PCT/CN2022/105208, filed on Jul. 12, 2022, which claims priority to Chinese Patent Application No. 202110799651.1, filed on Jul. 15, 2021. The entire contents of each of the above-referenced applications are expressly incorporated herein by reference.

TECHNICAL FIELD

The present disclosure relates to the technical field of communication devices, and in particular to a display module and an electronic device.

BACKGROUND

With the development of technologies, increasingly more technologies are applied to electronic devices. For example, compared with the conventional fingerprint recognition module that needs to be separately deployed outside a display screen of an electronic device, a fingerprint recognition module being deployed in an area in which the display screen is located has already appeared. However, in the conventional combined solution of a display screen and a fingerprint recognition module, the fingerprint recognition module is disposed under the display screen, which leads to a relatively large overall thickness of the electronic device.

SUMMARY

The embodiments of the present disclosure provide a display module and an electronic device.

The present disclosure is implemented as follows:

According to a first aspect, an embodiment of the present disclosure discloses a display module. The display module includes an acoustic-electrical conversion layer, a plurality of first electrodes, a plurality of second electrodes, and a plurality of third electrodes, where the plurality of first electrodes and the plurality of third electrodes are provided at intervals on two opposite sides of the acoustic-electrical conversion layer, respectively, and in a thickness direction of the acoustic-electrical conversion layer, projections of the first electrodes and projections of the third electrodes are arranged at intervals;

the second electrodes are provided at intervals on the two opposite sides of the acoustic-electrical conversion layer, and in the thickness direction of the acoustic-electrical conversion layer, one of the first electrodes or one of the third electrodes is provided in correspondence with at least two of the second electrodes; and the display module has a touch mode and an ultrasonic mode, where in the touch mode, the first electrode is a driving electrode, the third electrode is a receiving electrode, and the first electrode and the third electrode are configured to detect a touch capacitance; and in the ultrasonic mode, the first electrode and the third electrode that are correspondingly provided with the second electrode are driving electrodes, the second electrode is a receiving electrode, the driving electrode drives the acoustic-electrical conversion layer to generate an ultrasonic wave, and the receiving electrode is configured to receive a reflected ultrasonic wave.

According to a second aspect, an embodiment of the present disclosure discloses an electronic device, including the foregoing display module.

Embodiments of the present disclosure disclose a display module, including an acoustic-electrical conversion layer, a plurality of first electrodes, a plurality of second electrodes, and a plurality of third electrodes. The first electrodes and the third electrodes are provided at intervals on two opposite sides of the acoustic-electrical conversion layer, and a plurality of second electrodes are further provided on the two opposite sides of the acoustic-electrical conversion layer, and one first electrode or one third electrode corresponds to at least two second electrodes. In addition, in the foregoing display module, the first electrode and the third electrode that are correspondingly provided with the second electrode are driving electrodes for driving the acoustic-electrical conversion layer to generate an ultrasonic wave, and the second electrode is a receiving electrode used to receive an electrical signal generated by the acoustic-electrical conversion layer when reflected ultrasonic waves act on the acoustic-electrical conversion layer, so that the display mode has an ultrasonic mode that can provide a fingerprint recognition function for the display module. In addition, in the foregoing display module, the first electrode is a driving electrode, the third electrode is a receiving electrode, and the first electrode and the third electrode can detect a touch capacitance, so that the display module also has a touch mode. Therefore, since the foregoing display module has both a touch function and an ultrasonic function, and a structure that provides an ultrasonic recognition function can also be used to provide the touch function, so that the display module does not need to be separately disposed with a fingerprint recognition module, and an overall thickness of the display module with the fingerprint recognition function is relatively small, and finally, an overall thickness of an electronic device is relatively small.

BRIEF DESCRIPTION OF DRAWINGS

The accompanying drawings described herein are intended to provide a further understanding of the present disclosure, and constitute a part of the present disclosure. The illustrative embodiments of the present disclosure and descriptions thereof are intended to describe the present disclosure, and do not constitute limitations on the present disclosure. In the accompanying drawings.

DETAILED DESCRIPTION

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The terms "first", "second", and the like in this specification and claims of the present disclosure are used to distinguish between similar objects instead of describing a specific order or sequence. It should be understood that data used in such a way are interchangeable in proper circumstances, so that the embodiments of the present disclosure can be implemented in an order other than the order illustrated or described herein. Objects classified by "first", "second", and the like are usually of a same type, and the quantity of objects is not limited. For example, there may be one or more first objects. In addition, in this specification and the claims. "and/or" represents at least one of connected objects, and a character "/" generally represents an "or" relationship between associated objects.

With reference to the accompanying drawings, a display module and an electronic device provided in embodiments of the present disclosure is described in detail by using specific embodiments and application scenarios thereof.

As shown in FIG. 1 to FIG. 6, an embodiment of present disclosure provides a display module. The display module may be applied to an electronic device, and includes an acoustic-electrical conversion layer 100, a plurality of first electrodes 310, a plurality of second electrodes 320, and a plurality of third electrodes 330.

Figure 1:
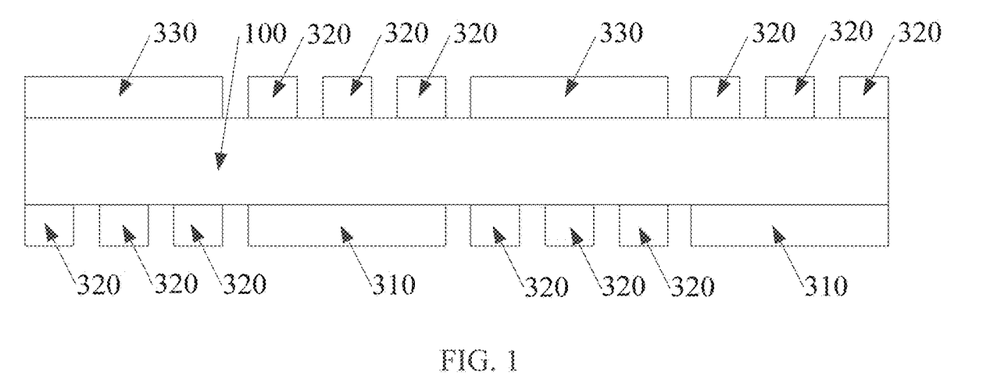
FIG. 1 is a schematic diagram of a sectional structure of a display module according to an embodiment of the present disclosure.

The acoustic-electrical conversion layer 100 is made of a material with a capability of converting an acoustic signal into an electrical signal and converting an electrical signal into an acoustic signal, and a size such as a thickness of the acoustic-electrical conversion layer 100 may be determined according to an actual requirement. In some embodiments, the acoustic-electrical conversion layer 100 is made of a piezoelectric material. When the acoustic-electrical conversion layer 100 is subjected to an electrical signal, the acoustic-electrical conversion layer 100 can generate an acoustic wave by using an inverse piezoelectric effect Correspondingly, when the acoustic-electrical conversion layer 100 is affected by the acoustic wave, the acoustic-electrical conversion layer 100 can generate an electrical signal by using a direct piezoelectric effect. In this way, mutual conversion between an acoustic signal and an electrical signal is implemented. The acoustic-electrical conversion layer 100 may further be formed by using other materials with the foregoing capability, which are not listed one by one.

The first electrodes 310 and the third electrodes 330 are provided at intervals on two opposite sides of the acoustic-electrical conversion layer 100. For example, the plurality of first electrodes 310 are provided on a first side of the acoustic-electrical conversion layer 100, the plurality of second electrodes 320 are provided on a second side of the acoustic-electrical conversion layer 100, the first electrodes 310 are spaced apart from each other, and the third electrodes 330 are spaced apart from each other, so that any two adjacent first electrodes 310 are insulated from each other, and any two adjacent third electrodes 330 are insulated from each other. In this way, the first electrodes 310 and the third electrodes 330 can work independently. Correspondingly, in a wiring process, each first electrode 310 and each third electrode 330 also need to be connected to independent cables separately, to ensure that the first electrodes 310 and the third electrodes 330 are insulated from each other. In addition, in a thickness direction of the acoustic-electrical conversion layer 100, projections of the first electrodes 310 and projections of the third electrodes 330 are arranged at intervals, to ensure that the first electrodes 310 and the third electrodes 330 do not overlap each other, so that the first electrodes 310 and the third electrodes 330 have a basis to be used as a touch unit. Further, the first electrode 310 and the third electrode 330 are insulated from each other by using the acoustic-electrical conversion layer 100, to ensure that the first electrode 310 and the third electrode 330 that meet the foregoing arrangement can form a touch unit. In this way, a touch function is provided for the display module by using the first electrode 310 and the third electrode 330.

For example, shapes and sizes of the first electrode 310 and the third electrode 330 may be determined according to an actual requirement, and are not limited herein. Both the first electrode 310 and the third electrode 330 may be separately fixed to two opposite sides of the acoustic-electrical conversion layer 100 through adhesion by using conductive adhesives, to ensure relatively high reliability of a connection between the first electrode 310 and the third electrode 330 and the acoustic-electrical conversion layer 100, and both the first electrode 310 and the third electrode 330 can transmit electrical signals to the acoustic-electrical conversion layer 100. In addition, to ensure that the first electrode 310 and the third electrode 330 can form a touch unit, in a process in which the first electrode 310 and the third electrode 330 are electrified, an electrical connection direction of the first electrode 310 and an electrical connection direction of the third electrode 330 further need to be perpendicular to each other. Therefore, in a case that both the first electrode 310 and the third electrode 330 are electrified, when a user touches the display module, the capacitance between the corresponding first electrode 310 and the third electrode 330 can change, and a position at which the capacitance changes may be detected by using a component such as a detection circuit, to implement touch position identification.

To further enable the display module to have an ultrasonic recognition capability, the plurality of second electrodes 320 may be provided at intervals on the two opposite sides of the acoustic-electrical conversion layer 100, that is, the second electrodes 320 are provided on both of the two opposite sides of the acoustic-electrical conversion layer 100, and adjacent second electrodes 320 are spaced apart from each other, so that the second electrodes 320 are insulated from each other, thereby ensuring that each second electrode 320 can independently output an electrical signal. In a process of arranging the second electrodes 320, one first electrode 310 or one third electrode 330 may be arranged opposite to at least two second electrodes 320. For example, at least two second electrodes 320 form one group, and the group of second electrodes 320 as an entirety are provided opposite to one first electrode 310, or are provided opposite to one third electrode 330. In some embodiments, among the plurality of first electrodes 310, it might be only a part of the first electrodes 310 that are correspondingly provided with the second electrode 320. Similarly, among the plurality of third electrodes 330, it might be only a part of the third electrodes 330 that are correspondingly provided with the second electrode 320. Further, a quantity of second electrodes 320 corresponding to different first electrodes 310 (or third electrodes 330) may be the same or different.

The second electrodes 320 are provided on the two opposite sides of the acoustic-electrical conversion layer 100, so that both the first electrode 310 and the third electrode 330 located on the first side of the acoustic-electrical conversion layer 100 can be used as driving electrodes, so that an electrical signal is output to the acoustic-electrical conversion layer 100, and the acoustic-electrical conversion layer 100 vibrates to generate an acoustic wave. The second electrodes 320 on the two opposite sides of the acoustic-electrical conversion layer 100 may be used as receiving electrodes, to receive an electrical signal generated by the acoustic-electrical conversion layer 100 by the action of the reflected acoustic wave on the acoustic-electrical conversion layer 100, so that the display module has an ultrasonic recognition capability. In a process of performing ultrasonic identification by the display module, a specific parameter of an electrical signal received by the receiving electrode generally needs to be detected by using another component. Since energy of reflected acoustic waves reflected by a fingerprint valley and a fingerprint ridge of a user's finger are different, and then different reflected waves cause different voltages of electrical signals generated by the acoustic-electrical conversion layer 100, voltages of electrical signals received by different second electrodes 320 are detected, so that the display module also has an ultrasonic recognition capability.

Based on the foregoing display module, the display module has a touch mode and an ultrasonic mode.

In the touch mode, the first electrode 310 is a driving electrode, the third electrode 330 is a receiving electrode, and the first electrode 310 and the third electrode 330 can detect a touch capacitance. As described above, the first electrode 310 and the third electrode 330 are insulated from each other, and electrical connection directions of the first electrode 310 and the third electrode 330 are perpendicular to each other. In this case, the first electrode 310 is a driving electrode, and the third electrode 330 is a receiving electrode, and each second electrode 320 is suspended or has a determined voltage, so that in a case that a living body touches the display module, a capacitance between the first electrode 310 and the third electrode 330 can change, and a specific position at which the capacitance changes in the display module can be obtained under the action of a detection circuit, thereby detecting and recognizing a touch position.

In the ultrasonic mode, the first electrode 310 and the third electrode 330 that are correspondingly provided with the second electrode 320 are driving electrodes, and the second electrode 320 is used as a receiving electrode. For example, as described above, it might be only a part of the first electrodes 310 (or a part of the third electrodes 330) that are correspondingly provided with the second electrode 320. Therefore, in this mode, only the first electrode 310 and the third electrode 330 that are correspondingly provided with the second electrode 320 are used as driving electrodes, so that the second electrode 320 that is used as the receiving electrode can receive a corresponding electrical signal. Therefore, in one of the embodiments, if the second electrode 320 is not correspondingly provided for a specific first electrode 310 (or a specific third electrode 330), the first electrode 310 (or the third electrode 330) may not be used as the driving electrode. In one aspect, power can be saved, and in another aspect, the first electrode 310 (or the third electrode 330) that is not correspondingly provided with the second electrode 320 is prevented from working as the driving electrode, such that the adverse impact on receiving precision of the second electrode 320 used as the receiving electrode can also be prevented.

In the ultrasonic mode, in a case that the driving electrode is electrified, the driving electrode may drive the acoustic-electrical conversion layer 100 to generate an ultrasonic wave. After the ultrasonic waves generated by the acoustic-electrical conversion layer 100 are emitted outwards, the ultrasonic waves are reflected when being blocked by an object or a living body. The reflected ultrasonic waves act on the acoustic-electrical conversion layer 100, so that an electrical signal is generated in a corresponding area on the acoustic-electrical conversion layer 100. Correspondingly, the second electrode 320 used as the receiving electrode may receive the electrical signal generated by the acoustic-electrical conversion layer 100, so that the display module has the ultrasonic mode. In addition, as described above, electrical signals respectively received by the plurality of second electrodes 320 may be separately identified by using another component such as a detection circuit, to implement ultrasonic recognition.

An embodiment of the present disclosure discloses a display module, and the display module includes an acoustic-electrical conversion layer 100, a plurality of first electrodes 310, a plurality of second electrodes 320, and a plurality of third electrodes 330. The first electrodes 310 and the third electrodes 330 are provided at intervals on two opposite sides of the acoustic-electrical conversion layer 100, respectively, and a plurality of second electrodes 320 are further provided on the two opposite sides of the acoustic-electrical conversion layer 100. One first electrode 310 or one third electrode 330 corresponds to at least two second electrodes 320. In addition, in the foregoing display module, the first electrode 310 and the third electrode 330 that are correspondingly provided with the second electrode 320 are driving electrodes for driving the acoustic-electrical conversion layer 100 to generate an ultrasonic wave, and the second electrode 320 is a receiving electrode for receiving an electrical signal generated by the acoustic-electrical conversion layer 100 when the reflected ultrasonic waves act on the acoustic-electrical conversion layer 100, so that the display module has an ultrasonic mode, and a fingerprint recognition function can be provided for the display module. In addition, in the foregoing display module, the first electrode 310 is a driving electrode, the third electrode 330 is a receiving electrode, and the first electrode 310 and the third electrode 330 can detect a touch capacitance, so that the display module also has a touch mode. Therefore, the foregoing display module has both a touch function and an ultrasonic function, and a structure that provides an ultrasonic recognition function is multiplexed to provide the touch function, so that a fingerprint recognition module does not need to be separately provided in the display module, and an overall thickness of the display module that has the fingerprint recognition function is relatively small, and finally, an overall thickness of an electronic device is relatively small.

As described above, the display module may be applied to an electronic device. In a process of installing the display module, the display module may be installed on a middle frame of the electronic device. The middle frame is a mounting infrastructure that is in the electronic device and that is used to carry an internal component of the electronic device. For example, a component such as a battery or a chip of the electronic device may be supported and mounted on the middle frame. Correspondingly, the display module may also be carried on the middle frame, to ensure relatively high installation stability of the display module. In some embodiments, the display module is attached to the middle frame. In this case, installation stability of the display module can be improved to at a certain extent. In addition, when the foregoing technical solution is used, a material such as foam may be disposed between the display module and the middle frame, to provide certain avoidance space for vibration of the acoustic-electrical conversion layer 100 by using the material such as foam, so as to ensure that the acoustic-electrical conversion layer 100 does not affect another component in the display module in a process of vibrating after being electrified.

In one of the embodiments, a certain gap may be formed between the display module and the middle frame, so that an acoustic wave reflection cavity is formed by using the gap. A size of the acoustic wave reflection cavity in a thickness direction of the display module may be determined according to an actual situation, and is not limited herein. In addition, a size of any position of the acoustic wave reflection cavity in the thickness direction of the display module may be made basically consistent, to ensure that reflection situations of ultrasonic waves generated at various positions on the acoustic-electrical conversion layer 100 are basically the same, thereby reducing difficulty in an ultrasonic recognition process and further improving precision of ultrasonic recognition.

For example, the first electrode 310 may be provided between the acoustic-electrical conversion layer 100 and the middle frame Correspondingly, the third electrode 330 is provided on a side that is of the acoustic-electrical conversion layer 100 and that is away from the middle frame. In this case, the first electrode 310 and the middle frame form the acoustic wave reflection cavity in a thickness direction of the acoustic-electrical conversion layer 100.

An acoustic wave reflection cavity is formed between the display module and the middle frame, so that the acoustic-electrical conversion layer 100 has specific vibration space, thereby improving reliability of the acoustic-electrical conversion layer 100. In addition, since an electrical signal sent by the driving electrode is a pulse signal, an emission direction of an ultrasonic wave generated by the acoustic-electrical conversion layer 100 also includes two opposite directions, that is, a first direction that faces a display surface of the display module and a second direction that deviates from the display surface of the display module. Ultrasonic waves propagating in the first direction can be directly emitted in a direction in which the display surface is located, and ultrasonic waves propagating in the second direction may not reach the display surface. The acoustic wave reflection cavity is provided between the display module and the middle frame, so that a part of the acoustic waves generated by the acoustic-electrical conversion layer 100 that propagate in the second direction and in a direction close to the middle frame can also be reflected on a surface of the middle frame in the acoustic wave reflection cavity, and finally are emitted in a direction in which the display surface of the display module is located. Further, in the foregoing technical solution, a quantity of reflected ultrasonic waves can be increased in the ultrasonic mode, to increase a quantity of electrical signals that can be received by the receiving electrode, and finally improve precision of ultrasonic recognition.

In a case that the ultrasonic wave reflection cavity is provided between the display module and the middle frame, a support structure needs to be provided between the display module and the middle frame. For example, a plurality of support structures such as support blocks may be provided at a plurality of positions between the display module and the middle frame, so that a relatively reliable support function is provided for the display module while a coverage area of the ultrasonic wave reflection cavity is affected as small as possible. In some embodiments, the support structure may be a part included in the display module, or may be a part outside the display module.

Figure 2:
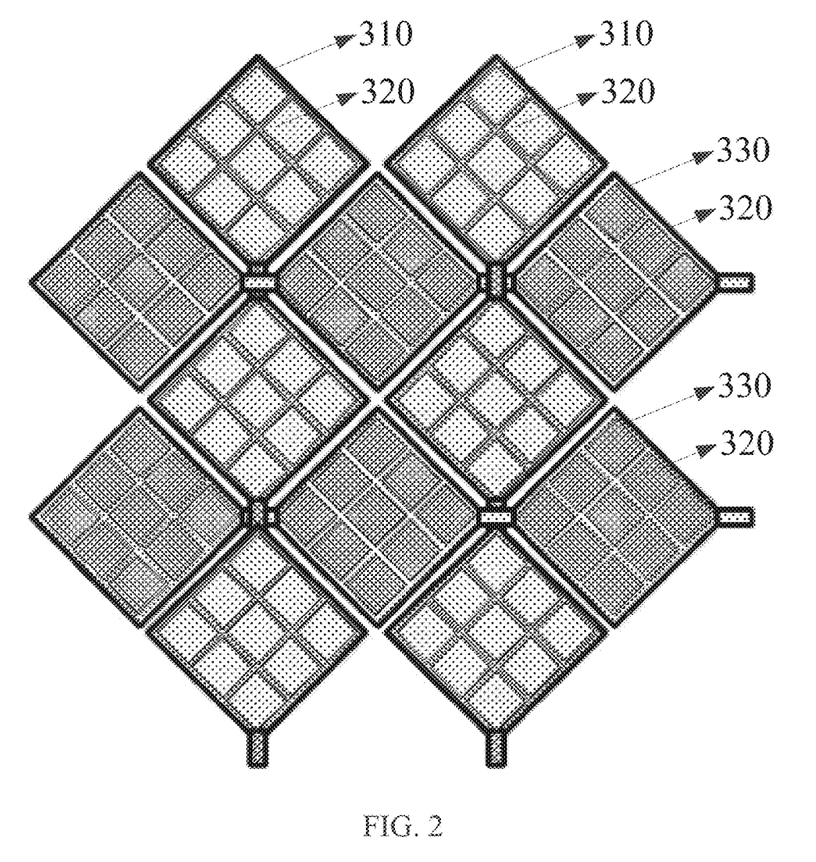
FIG. 2 is a schematic diagram of distribution of first electrodes, second electrodes, and third electrodes in a display module according to an embodiment of the present disclosure.
Figure 3:
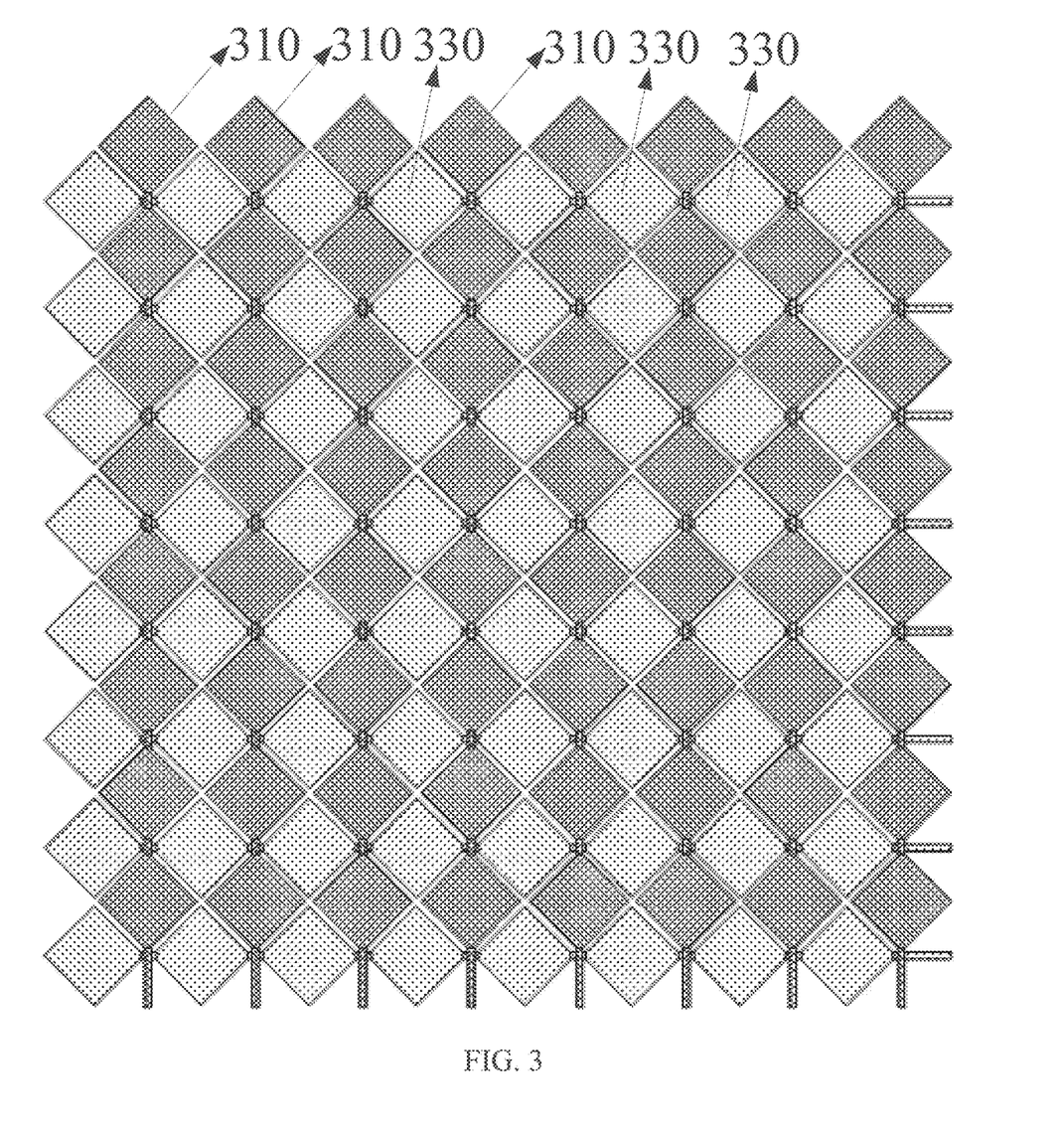
FIG. 3 is a schematic diagram of assembly of first electrodes and third electrodes in a display module according to an embodiment of the present disclosure.
Figure 4:
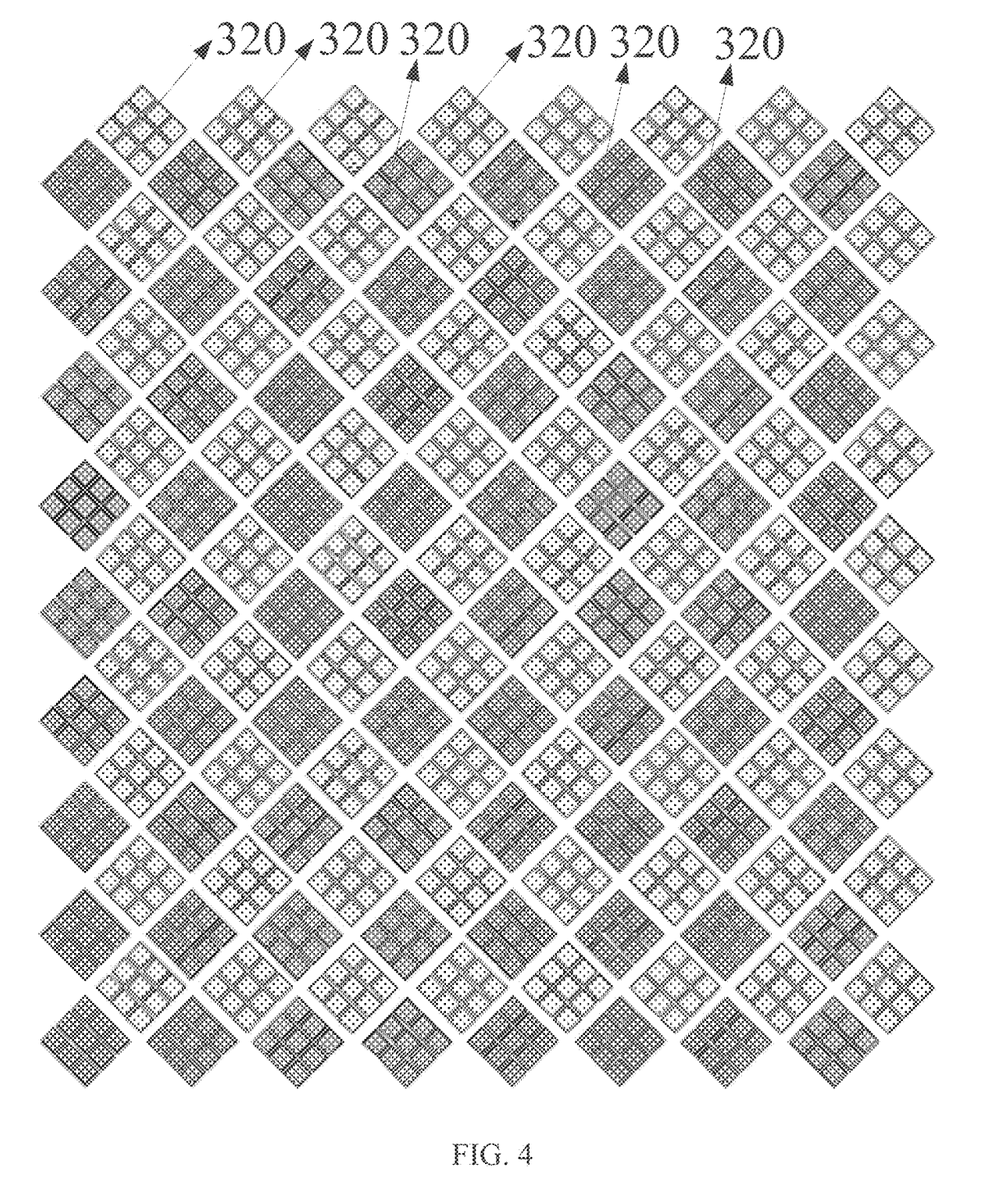
FIG. 4 is a schematic diagram of distribution of second electrodes in a display module according to an embodiment of the present disclosure.
Figure 5:
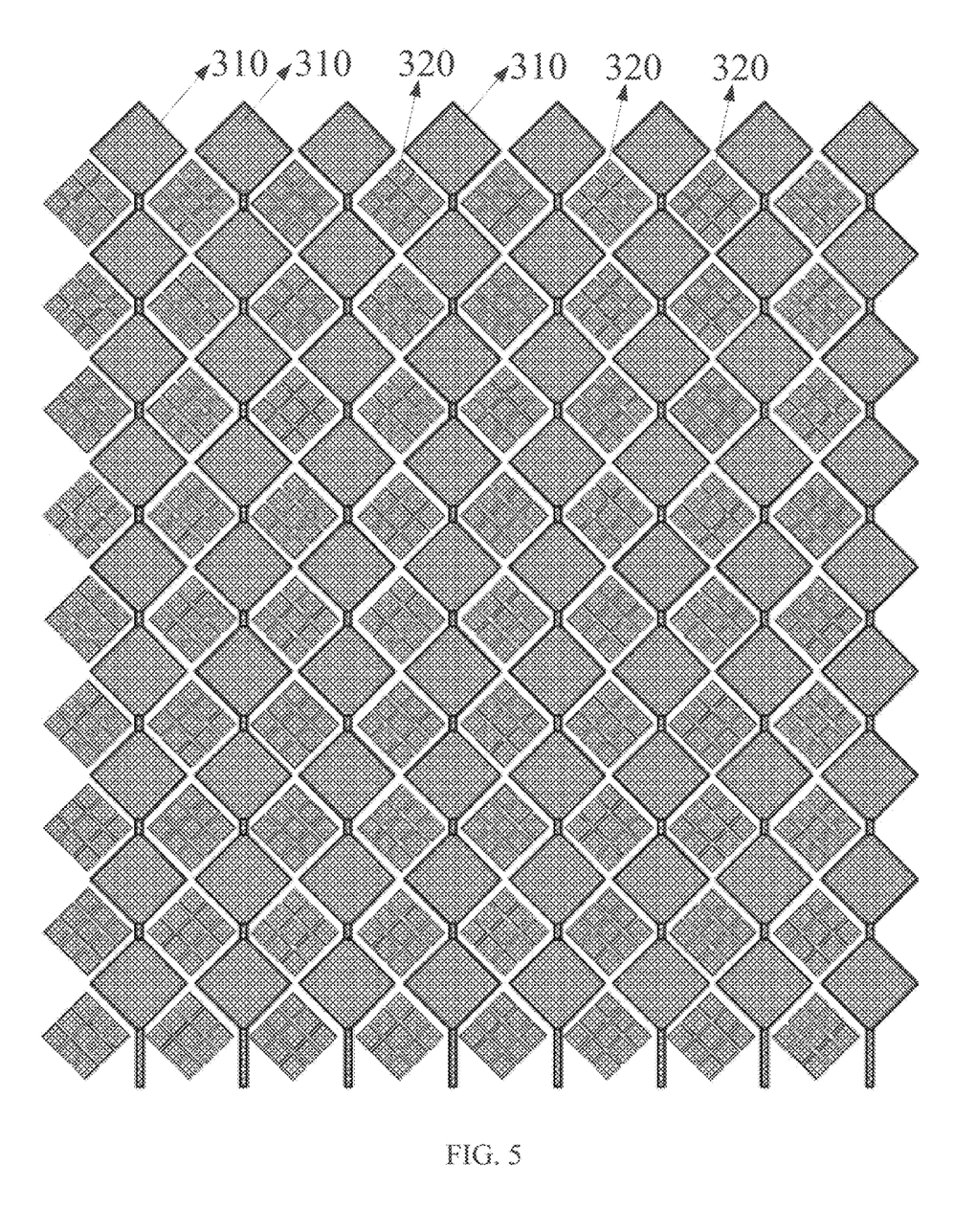
FIG. 5 is a schematic diagram of a structure of one side of an acoustic-electrical conversion layer in a display module according to an embodiment of the present disclosure.
Figure 6:
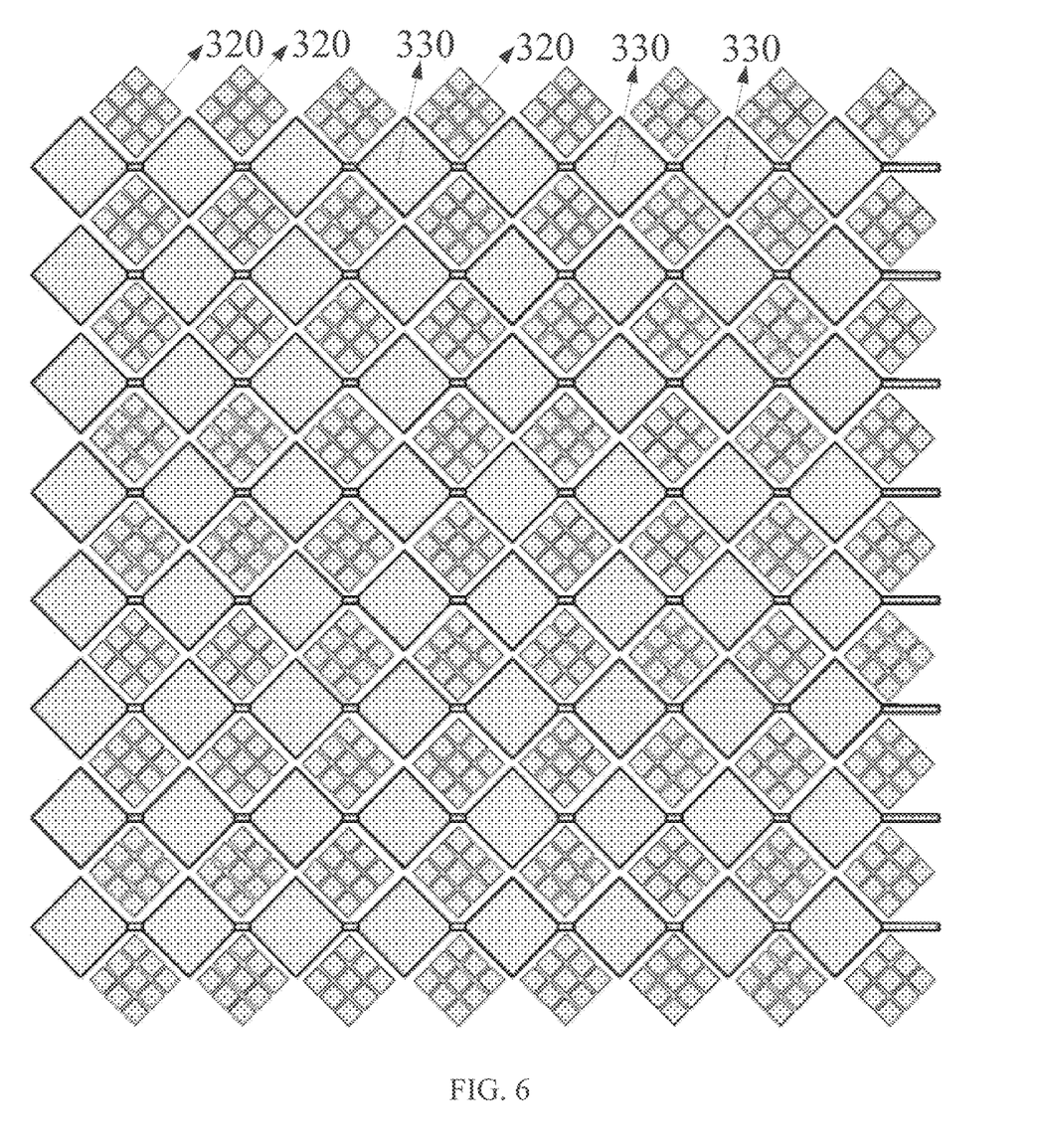
FIG. 6 is a schematic diagram of a structure of the other side of an acoustic-electrical conversion layer in a display module according to an embodiment of the present disclosure.

As described above, the first electrodes 310 and the third electrodes 330 are separately provided on two opposite sides of the acoustic-electrical conversion layer 100, the plurality of first electrodes 310 are spaced apart from each other, and the plurality of third electrodes 330 are spaced apart from each other. In some embodiments, in a process of arranging the first electrodes 310 and the third electrodes 330, in the thickness direction of the acoustic-electrical conversion layer 100, as shown in FIG. 2, projections of the first electrodes 310 and projections of the third electrodes 330 may be arranged in arrays and be arranged alternately. For example, the first electrodes 310 and the third electrodes 330 may have a same shape, and sizes of the first electrodes 310 and the third electrodes 330 are equal. This facilitates processing of the first electrodes 310 and the third electrodes 330. In addition, in a process of arranging the first electrodes 310 and the third electrodes 330 on the two opposite sides of the acoustic-electrical conversion layer 100, shapes and sizes of the first electrodes 310 and the third electrodes 330 are made equal, so that space utilization can be maximized, and touch precision can be improved.

For example, both the first electrode 310 and the third electrode 330 are circular. In this case, it can be ensured that the first electrode 310 and the third electrode 330 have mutually perpendicular electrical connection directions. In another embodiment of the present disclosure, both the first electrode 310 and the third electrode 330 are squares of equal sizes. In this case, a gap between the first electrode 310 and the third electrode 330 may be relatively small, so that touch precision of the display module can be further improved. In addition, in the foregoing embodiment, opposite corners of two adjacent first electrodes 310 are connected to each other, and opposite corners of two adjacent third electrodes 330 are connected to each other, so that an electrical connection direction of the first electrode 310 and an electrical connection direction of the third electrode 330 are perpendicular to each other. In addition, in a case that both the first electrode 310 and the third electrode 330 are connected in the abovementioned manner, a conductive part such as a wire used to connect the first electrodes 310 can further be prevented from being stacked with the third electrode 330, and a conductive part used to connect the third electrodes 330 can be prevented from being stacked with the first electrode 310, to prevent the conductive part from affecting the first electrode 310 and the third electrode 330 being used as touch units. In addition, in the foregoing connection manner, sizes of the conductive parts may be relatively small, thereby reducing costs.

As described above, one or more of the first electrodes 310 may be correspondingly provided with the second electrode 320, respectively. And one or more of the third electrodes 330 may be correspondingly provided with the second electrode 320, respectively. To improve space utilization, for example, in the thickness direction of the acoustic-electrical conversion layer 100, any of the first electrode 310 and any of the third electrodes 330 may be correspondingly provided with at least two of the second electrodes 320, respectively. In a case that this technical solution is used, the display module further has a full-screen recognition function, that is, a user may perform fingerprint recognition at any position on the display module. This can greatly improve convenience of fingerprint recognition, and further improve user experience.

In addition, at least two second electrodes 320 corresponding to the first electrode 310 may be arranged in an array, and/or at least two second electrodes 320 corresponding to the third electrode 330 may be arranged in an array. This can improve spatial utilization and improve, at a certain extent, receiving performance of at least two second electrodes 320 corresponding to a same first electrode 310 (or a same third electrode 330) for ultrasonic waves. For example, in a case that both the first electrode 310 and the third electrode 330 are in a square structure, each second electrode 320 may also be in a square structure, and at least two second electrodes 320 corresponding to a same first electrode 310 (or a same third electrode 330) are arranged in an array.

Compared with a relatively low pulse frequency and pulse amplitude in the touch mode, a frequency of a pulse signal sent by the driving electrode in the ultrasonic mode is relatively high, and a pulse amplitude is also relatively large, and power consumption of the ultrasonic mode is also relatively high. Therefore, to reduce power consumption of the display module, in a process in which the display module works in a specified scenario, the display module may first work in the touch mode, and in a case that the display module works in the touch mode and it is detected through the change of the capacitance that a living body such as the user's finger approaches or comes into contact with the display module, the display module may be switched to the ultrasonic mode, to ensure that the user can use the display module to perform fingerprint recognition. The foregoing specified scenario may be a lock screen interface, a payment confirmation interface, or the like. A person skilled in the art may further assign a value to a specified scenario according to an actual situation of the electronic device, to expand an application range of the foregoing control modes, so as to further reduce power consumption of the display module.

As described above, in one of the embodiments, any position on the display module has an ultrasonic recognition capability. In this case, power consumption of the display module may be further aggravated. Based on the foregoing embodiment, the display module may also be made to first work in the touch mode when working in the foregoing specified scenario, and then the display module is switched to the ultrasonic mode to perform fingerprint recognition when a living body approaches or comes into contact with the display module.

Further, the display module works in the touch mode, and may further detect an area that may be touched by the living body. Based on this, the display module may further be controlled to switch an area that may be touched by the living body from the touch mode to the ultrasonic mode. For an area that is not likely to be touched by the living body, the display module may still make the area work in the touch mode, to further reduce power consumption of the display module.

As described above, in a process of arranging the second electrodes 320, for example, quantities of second electrodes 320 corresponding to different first electrodes 310 (or third electrodes 330) may be the same or different, and parameters such as an arrangement manner and an interval of the plurality of second electrodes 320 may be the same or different. In one of the embodiments of the present disclosure, each of the second electrodes 320 may have a same shape and a same size, and a quantity of any group of second electrodes 320 corresponding to the first electrode 310 (and/or the third electrode 330) may be equal, so as to facilitate arranging any group of second electrodes 320 in an array. Further, in the thickness direction of the acoustic-electrical conversion layer 100, an external contour of any of the first electrodes 310 may overlap a graph enclosed by external contours of a plurality of second electrodes 320 corresponding to the first electrode 310, and/or an external contour of any of the third electrodes 330 may overlap a graph enclosed by external contours of a plurality of second electrodes 320 corresponding to the third electrode 330.

In a case that the foregoing technical solution is used, when ultrasonic waves emitted from any position in an area that is in the acoustic-electrical conversion layer 100 and that is corresponding to the first electrode 310 and/or the third electrode 330 are reflected and then act on the acoustic-electrical conversion layer 100, it can be basically ensured that all electrical signals generated at corresponding positions of the acoustic-electrical conversion layer 100 can be received by second electrodes 320 provided at corresponding positions. This can increase spatial utilization of the display module, and maximize a receiving range of the second electrode 320, thereby improving precision of fingerprint recognition. It should be noted that an electrical signal generated when an acoustic wave emitted from an area that is in the acoustic-electrical conversion layer 100 and that is corresponding to a gap between the second electrodes 320 is reflected and then acts on a corresponding position of the acoustic-electrical conversion layer 100 may not be received by the second electrode 320. However, in an actual application process, a gap between adjacent second electrodes 320 is relatively small, and specific parameters of electrical signals received by adjacent second electrodes 320 may be calculated, and a theoretical parameter of an electrical signal in an area between second electrodes 320 are compensated by using a corresponding algorithm, to improve precision of fingerprint recognition.

As described above, in the ultrasonic mode, the first electrode 310 and the third electrode 330 that are correspondingly provided with the second electrode 320 are driving electrodes, to send an electrical signal to a corresponding area of the acoustic-electrical conversion layer 100, so that a corresponding area in the acoustic-electrical conversion layer 100 vibrates, and the electrical signal is converted into a sound signal. In order that parts corresponding to different driving electrodes in a vibration process of the acoustic-electrical conversion layer 100 can be mutually independent, for example, the acoustic-electrical conversion layer 100 includes a plurality of conversion sub-layers, and any of the first electrodes 310 and any of the third electrodes 330 are corresponding to one of the conversion sub-layers, respectively. In this case, the conversion sub-layers are independent of each other, so that it can be ensured that no mutual interference occurs in a vibration process of the conversion sub-layers, and working reliability of the entire acoustic-electrical conversion layer 100 is further improved.

For example, an actual size of the conversion sub-layer may be corresponding to a size of a corresponding electrode (including the first electrode 310 and the third electrode 330). Further, a size of the conversion sub-layer may be slightly larger than a size of a corresponding electrode. In detail, in the thickness direction of the acoustic-electrical conversion layer 100, an edge of a projection of any of the conversion sub-layers corresponding to the first electrode 310 may be located outside the first electrode 310, and an edge of a projection of any of the conversion sub-layers corresponding to the third electrode 330 is located outside the third electrode 330. In this way, the conversion sub-layer corresponding to the first electrode 310 can cover the first electrode 310, and the conversion sub-layer corresponding to the third electrode 330 can cover the third electrode 330, so that it is ensured that an electrical signal output at any position in the first electrode 310 and the third electrode 330 used as the driving electrodes may function on a corresponding conversion sub-layer, and the conversion sub-layer vibrates and send a sound signal. This expands a fingerprint recognition range to some extent and further improves precision of fingerprint recognition.

Based on the display module disclosed in any one of the foregoing embodiments, the present disclosure further discloses an electronic device, and the electronic device includes any one of the foregoing display modules. The electronic device may further include components such as a housing and a battery. In consideration of brevity of text, detailed descriptions are not provided one by one herein.

The electronic device disclosed in the embodiments of the present disclosure may be a mobile phone, a computer, an e-book reader, a wearable device, or the like A specific type of the electronic device is not limited in the embodiments of the present disclosure.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of the present disclosure is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

The embodiments of the present disclosure are described above with reference to the accompanying drawings, but the present disclosure is not limited to the foregoing specific implementations, and the foregoing specific implementations are only illustrative and not restrictive Under the enlightenment of the present disclosure, those of ordinary skill in the art can make many forms without departing from the purpose of the present disclosure and the protection scope of the claims, all of which fall within the protection of the present disclosure.

The invention claimed is:

1. A display module, comprising an acoustic-electrical conversion layer; a plurality of first electrodes; a plurality of second electrodes; and a plurality of third electrodes,
wherein:
the first electrodes and the third electrodes are provided at intervals on two opposite sides of the acoustic-electrical conversion layer, respectively, and in a thickness direction of the acoustic-electrical conversion layer, projections of the first electrodes and projections of the third electrodes are arranged at intervals,
the second electrodes are provided at intervals on the two opposite sides of the acoustic-electrical conversion layer, and in the thickness direction of the acoustic-electrical conversion layer, one of the first electrodes or one of the third electrodes is provided in correspondence with at least two of the second electrodes, and
the display module has a touch mode and an ultrasonic mode,
wherein:
in the touch mode, the first electrode is a driving electrode, the third electrode is a receiving electrode, and the first electrode and the third electrode are configured to detect a touch capacitance, and
in the ultrasonic mode, the first electrode and the third electrode that are correspondingly provided with the second electrode are driving electrodes, the second electrode is a receiving electrode, the driving electrode drives the acoustic-electrical conversion layer to generate an ultrasonic wave, and the receiving electrode is configured to receive a reflected ultrasonic wave.

2. The display module according to claim 1, wherein:
the display module is provided on a middle frame of an electronic device,
the first electrode is located between the middle frame and the acoustic-electrical conversion layer, and
in the thickness direction of the acoustic-electrical conversion layer, the first electrode and the middle frame define an acoustic wave reflection cavity.

3. The display module according to claim 1, wherein in the thickness direction of the acoustic-electrical conversion layer, at least one of the first electrodes and at least one of the third electrodes are correspondingly provided with at least two of the second electrodes, respectively.

4. The display module according to claim 1, wherein at least two second electrodes corresponding to the first electrode are arranged in an array, or at least two second electrodes corresponding to the third electrode are arranged in an array.

5. The display module according to claim 1, wherein in the thickness direction of the acoustic-electrical conversion layer,
an external contour of at least one of the first electrodes overlaps a projection of a graph surrounded by external contours of the second electrodes corresponding to the first electrode; or
an external contour of at least one of the third electrodes overlaps a projection of a graph surrounded by external contours of second electrodes corresponding to the third electrode.

6. The display module according to claim 1,
wherein:
in the thickness direction of the acoustic-electrical conversion layer, projections of the first electrodes and projections of the third electrodes are arranged in an array, and are arranged alternately; and
shapes of the first electrode and the third electrode are identical, and sizes of the first electrode and the third electrode are identical.

7. The display module according to claim 6,
wherein:

both the first electrode and the third electrode are in a square structure,
corners of two adjacent first electrodes are connected to each other, and
corners of two adjacent third electrodes are connected to each other.

8. The display module according to claim 1, wherein the acoustic-electrical conversion layer comprises a plurality of conversion sub-layers, and at least one of the first electrodes and at least one of the third electrodes are corresponding to one of the conversion sub-layers, respectively.

9. The display module according to claim 8, wherein in the thickness direction of the acoustic-electrical conversion layer,
an edge of a projection of at least one of the conversion sub-layers corresponding to the first electrode is located outside the first electrode, and
an edge of a projection of at least one of the conversion sub-layers corresponding to the third electrode is located outside the third electrode.

10. An electronic device, comprising a display module comprising:
an acoustic-electrical conversion layer, a plurality of first electrodes, a plurality of second electrodes, and a plurality of third electrodes,
wherein:
the first electrodes and the third electrodes are provided at intervals on two opposite sides of the acoustic-electrical conversion layer, respectively, and in a thickness direction of the acoustic-electrical conversion layer, projections of the first electrodes and projections of the third electrodes are arranged at intervals,
the second electrodes are provided at intervals on the two opposite sides of the acoustic-electrical conversion layer, and in the thickness direction of the acoustic-electrical conversion layer, one of the first electrodes or one of the third electrodes is provided in correspondence with at least two of the second electrodes, and
the display module has a touch mode and an ultrasonic mode,
wherein:
in the touch mode, the first electrode is a driving electrode, the third electrode is a receiving electrode, and the first electrode and the third electrode are configured to detect a touch capacitance, and
in the ultrasonic mode, the first electrode and the third electrode that are correspondingly provided with the second electrode are driving electrodes, the second electrode is a receiving electrode, the driving electrode drives the acoustic-electrical conversion layer to generate an ultrasonic wave, and the receiving electrode is configured to receive a reflected ultrasonic wave.

11. The electronic device according to claim 10, wherein:
the display module is provided on a middle frame of an electronic device,
the first electrode is located between the middle frame and the acoustic-electrical conversion layer, and
in the thickness direction of the acoustic-electrical conversion layer, the first electrode and the middle frame define an acoustic wave reflection cavity.

12. The electronic device according to claim 10, wherein in the thickness direction of the acoustic-electrical conversion layer, at least one of the first electrodes and at least one of the third electrodes are correspondingly provided with at least two of the second electrodes, respectively.

13. The electronic device according to claim 10, wherein at least two second electrodes corresponding to the first electrode are arranged in an array, or at least two second electrodes corresponding to the third electrode are arranged in an array.

14. The electronic device according to claim 10, wherein in the thickness direction of the acoustic-electrical conversion layer,
an external contour of at least one of the first electrodes overlaps a projection of a graph surrounded by external contours of the second electrodes corresponding to the first electrode; or
an external contour of at least one of the third electrodes overlaps a projection of a graph surrounded by external contours of second electrodes corresponding to the third electrode.

15. The electronic device according to claim 10, wherein:
in the thickness direction of the acoustic-electrical conversion layer, projections of the first electrodes and projections of the third electrodes are arranged in an array, and are arranged alternately; and
shapes of the first electrode and the third electrode are identical, and sizes of the first electrode and the third electrode are identical.

16. The electronic device according to claim 15, wherein:
both the first electrode and the third electrode are in a square structure,
corners of two adjacent first electrodes are connected to each other, and
corners of two adjacent third electrodes are connected to each other.

17. The electronic device according to claim 10, wherein the acoustic-electrical conversion layer comprises a plurality of conversion sub-layers, and at least one of the first electrodes and at least one of the third electrodes are corresponding to one of the conversion sub-layers, respectively.

18. The electronic device according to claim 17, wherein in the thickness direction of the acoustic-electrical conversion layer,
an edge of a projection of at least one of the conversion sub-layers corresponding to the first electrode is located outside the first electrode, and
an edge of a projection of at least one of the conversion sub-layers corresponding to the third electrode is located outside the third electrode.

* * * * *